US012793228B2

(12) United States Patent
Yin et al.

(10) Patent No.: US 12,793,228 B2
(45) Date of Patent: Nov. 10, 2026

(54) MULTI-SOURCE DOMAIN ADAPTIVE SEMANTIC SEGMENTATION METHOD AND DEVICE BASED ON MULTI-LEVEL DOMAIN CORRELATIONS

(71) Applicant: ZHEJIANG UNIVERSITY, Hangzhou (CN)

(72) Inventors: Jianwei Yin, Hangzhou (CN); Yuxiang Cai, Hangzhou (CN); Meng Xi, Hangzhou (CN); Yongheng Shang, Hangzhou (CN)

(73) Assignee: ZHEJIANG UNIVERSITY, Hangzhou (CN)

( * ) Notice: Subject to any disclaimer, the term of this patent is extended or adjusted under 35 U.S.C. 154(b) by 199 days.

(21) Appl. No.: 18/853,096

(22) PCT Filed: Oct. 7, 2023

(86) PCT No.: PCT/CN2023/123148
§ 371 (c)(1),
(2) Date: Sep. 30, 2024

(87) PCT Pub. No.: WO2025/043813
PCT Pub. Date: Mar. 6, 2025

(65) Prior Publication Data
US 2026/0187811 A1 Jul. 2, 2026

(30) Foreign Application Priority Data
Sep. 1, 2023 (CN) .......................... 202311119643.3

(51) Int. Cl.
*G06T 7/12* (2017.01)
*G06V 20/70* (2022.01)

(52) U.S. Cl.
CPC ................ *G06T 7/12* (2017.01); *G06V 20/70* (2022.01); *G06T 2207/20081* (2013.01)

(58) Field of Classification Search
None
See application file for complete search history.

(56) References Cited

U.S. PATENT DOCUMENTS 11,741,572 B2 * 8/2023 Yin .................... G06F 18/2155 345/619
12,340,565 B2 * 6/2025 Bai ...................... G06V 10/774
(Continued)

FOREIGN PATENT DOCUMENTS

CN 112699892 4/2021
CN 114708434 7/2022
CN 116486408 7/2023

*Primary Examiner* — Anand P Bhatnagar
(74) *Attorney, Agent, or Firm* — Jiwn Chen; Joywin IP Law PLLC

(57) ABSTRACT

Disclosed in the present invention is a multi-source domain adaptive semantic segmentation method based on multi-level domain correlations, including: (1) pre-training a cross-domain semantic segmentation model F on all source domains and a target domain; calculating multi-level domain correlations based on the pre-trained F, including domain-level source-target correlations $d_i$ and pixel-level source-target correlations $$w_i^{(h,w)};$$

constructing source-target domain mixed images $$x_h^i$$

(Continued)

and corresponding pseudo-labels $$y_h^i$$

based on $$w_i^{(h,w)};$$

constructing source-target domain mixed images $$x_m^i$$

and corresponding pseudo-labels $\widehat{y_m^i}$ based on a random sampling method; training the F on all the source domains and the target domain based on $d_i$, $$w_i^{(h,w)}, x_h^i, \widehat{y_h^i}, x_m^i, \text{ and } \widehat{y_m^i};$$

and performing, by the trained F, multi-source domain adaptive semantic segmentation on an image to be detected to extract a target object in the image. This method can improve weights of the source domains and the pixels in the source domains with high correlations with the target domain, and reduce weights of the source domains and the pixels in the source domains with low correlations with the target domain, so as to avoid interference of uncorrelated information of multi-source domains on the training.

10 Claims, 2 Drawing Sheets

(56) References Cited

U.S. PATENT DOCUMENTS

| | | | | |
|---|---|---|---|---|
| 12,423,825 | B2 * | 9/2025 | Yin | G06T 7/11 |
| 2011/0167105 | A1 * | 7/2011 | Ramakrishnan | G06Q 10/10 709/203 |
| 2014/0330743 | A1 * | 11/2014 | Ramakrishnan | G06Q 10/10 705/345 |
| 2021/0150281 | A1 * | 5/2021 | Tsai | G06V 10/82 |
| 2022/0028038 | A1 * | 1/2022 | Yin | G06F 18/2155 |
| 2024/0177460 | A1 * | 5/2024 | Bai | G06V 10/774 |
| 2024/0331165 | A1 * | 10/2024 | Yin | G06T 7/11 |
| 2025/0077979 | A1 * | 3/2025 | Li | H04L 67/306 |

* cited by examiner (a) Source Image (b) Target Image (c) High-correlation Source Pixels (d) Source-Target Mixed Image

MULTI-SOURCE DOMAIN ADAPTIVE SEMANTIC SEGMENTATION METHOD AND DEVICE BASED ON MULTI-LEVEL DOMAIN CORRELATIONS

This is a U.S. national stage application of PCT Application No. PCT/CN2023/123148 under 35 U.S.C. 371, filed Oct. 7, 2023 in Chinese, claiming priority of Chinese Application No. 202311119643.3, filed Sep. 1, 2023, all of which are hereby incorporated by reference.

FIELD OF TECHNOLOGY

The present invention belongs to the technical field of remote sensing image semantic segmentation, in particular to a multi-source domain adaptive semantic segmentation method based on multi-level domain correlations.

BACKGROUND TECHNOLOGY

Semantic segmentation is a pixel-level image interpretation task that aims to assign a semantic category to each pixel to extract a target object in an image (such as a mountain and water in a landscape photo). In recent years, with rapid development of deep neural networks, semantic segmentation has attracted wide attention and made remarkable progress in computer vision problems. However, this satisfactory performance usually requires large amounts of real (realistic) data as well as expensive fine-grained semantic label annotations. To overcome this bottleneck, a natural solution is to construct a synthetic data set to train a semantic segmentation model and then use it in a real-world environment. However, due to a serious domain shift between real data and synthetic data, the performance of the model would be significantly degraded when the model trained on a synthetic image is directly applied to segmentation of a real image. To address this problem, unsupervised domain adaptation (UDA) methods have been proposed to narrow a distribution gap between training data and test data. In practice, the UDA methods have received a lot of attentions because they do not require any labeling of a target domain, ultimately minimizing labeling costs. However, most existing UDA methods focus on single-source domain adaptation (SSDA). Only a few efforts have considered more practical scenarios, namely a plurality of labeled source datasets with various distributions, such as a SYNTHIA dataset and a GTA5 dataset. Training on different distributions of multi-source data can stimulate a model to learn more complementary knowledge, so as to achieve cross-domain semantic segmentation. A straightforward method is to simply mix all the source domains into one domain and then train a UDA model on the mixed source domain, as in a common SSDA method. While this simple method generally improves model performance, it does not take full advantage of rich and valuable information across multi-source domains, making it advantageous to learn a more powerful cross-domain segmentation model.

In order to make better use of multi-source domain information, multi-source domain adaptation (MSDA) methods are proposed to migrate models from multi-source domains (a plurality of training datasets with semantic labels) to a single target domain (a single test dataset without labels). These MSDA methods can make better use of multi-source domains and achieve better adaptation performance than the SSDA methods. However, in addition to MADAN [Sicheng Zhao, Bo Li, Pengfei Xu, Xiangyu Yue, Guiguang Ding, and Kurt Keutzer. 2021. MADAN: multi-source adversarial domain aggregation network for domain adaptation [C]. International Journal of Computer Vision 129, 8 (2021), 2399-2424.], MDACL [Jianzhong He, Xu Jia, Shuaijun Chen, and Jianzhuang Liu. 2021. Multi-source domain adaptation with collaborative learning for semantic segmentation [C]. In Proceedings of the IEEE Conference on Computer Vision and Pattern Recognition. 11008-11017.] and MDAPLR [So Jeong Park, Hae Ju Park, Eun Su Kang, Ba Hung Ngo, Ho Sub Lee, and Sung In Cho. 2022. Pseudo Label Rectification via Co-Teaching and Decoupling for Multisource Domain Adaptation in Semantic Segmentation [J]. IEEE Access 10 (2022), 91137-91149.], apart from working on pixel-level semantic segmentation tasks, most algorithms focus on image-level classification tasks. Specifically, Zhao et al. [Sicheng Zhao, Bo Li, Pengfei Xu, Xiangyu Yue, Guiguang Ding, and Kurt Keutzer. 2021. MADAN: multi-source adversarial domain aggregation network for domain adaptation [C]. International Journal of Computer Vision 129, 8 (2021), 2399-2424.] Multi-source domains and a target domain are aligned in an image space and distribution shifts among multi-source images are eliminated. He et al. [Jianzhong He, Xu Jia, Shuaijun Chen, and Jianzhuang Liu. 2021. Multi-source domain adaptation with collaborative learning for semantic segmentation [C]. In Proceedings of the IEEE Conference on Computer Vision and Pattern Recognition. 11008-11017], wherein firstly, source images are stylized to a target style, and then multiple segmentation models are trained to learn common semantic knowledge across multiple stylized source images and a target image through collaborative learning. These methods do improve the performance of MSDA in semantic segmentation, but they ignore the influence of different source domains on domain adaptation. Because the MSDA involves multi-source domains, different source domains have different data distributions, wherein some source domains of which data distributions are close to (similar to) the target domain contribute to the domain adaptation (towards the target domain), while some source domains that are not similar are harmful to the domain adaptation (towards the target domain). Simply treating all source domains equally is not the best solution to the MSDA problem. To solve this problem, Zuo et al. [Yukun Zuo, Hantao Yao, and Changsheng Xu. 2021. Attention-based multi-source domain adaptation [J]. IEEE Transactions on Image Processing 30 (2021), 3793-3803.] proposes to estimate similarity between a target domain and each source domain, and then align multi-source domains and the target domain by weighting different domains, so as to reduce the negative influence of dissimilar source domains. However, these MSDA methods are only suitable for image-level classification tasks, because they do not migrate pixel-level knowledge, they cannot be directly applied to semantic segmentation tasks. In addition, for the pixel-level segmentation tasks, existing MSDA methods ignore that even in similar source domains, some uncorrelated pixels would affect the adaptation performance. These uncorrelated source domain pixels would cause performance degradation, while correlated source domain pixels can better improve the adaptation performance. Therefore, in order to improve the adaptation performance of multi-source domains, it is necessary to avoid the influence of uncorrelated source domains and pixels therein as much as possible.

The existing multi-source domain adaptive semantic segmentation methods ignore importance of a domain-level source-target correlation (DSC) and a pixel-level source-target correlation (PSC) among domains. Existing similar multi-source domain adaptive image classification methods take into account the similarity between the target domain and each source domain, but do not consider uncorrelated pixels in similar source domains, wherein uncorrelated pixels also reduce the performance of the model. In addition, the multi-source domain adaptive image classification methods do not migrate the pixel-level knowledge, and is not suitable for the multi-source domain adaptive semantic segmentation methods.

SUMMARY OF THE INVENTION

An object of the present invention is to provide a multi-source domain adaptive semantic segmentation method and device based on multi-level domain correlations, which can improve weights of source domains and pixels in the source domains with high correlations with a target domain, and reduce weights of the source domains and the pixels in the source domains with low correlations with the target domain, so as to avoid interference of uncorrelated information of multi-source domains on the training.

The present invention provides the following technical solution:

A multi-source domain adaptive semantic segmentation method based on multi-level domain correlations, wherein the method comprises:

(1) pre-training a cross-domain semantic segmentation model F on all source domains $$\mathcal{D}_S^i$$

and a target domain $\mathcal{D}_T$;

(2) calculating the multi-level domain correlations based on the pre-trained cross-domain semantic segmentation model F, comprising domain-level source-target correlations $d_i$ and pixel-level source-target correlations $$w_i^{(h,w)},$$

h∈H, w∈W, wherein (h,w) indicates position coordinates of pixels in an image;

(3) constructing a source-target domain mixed image $$x_h^i$$

and a corresponding pseudo-label $\widehat{y_h^t}$ based on the pixel-level source-target correlations;

(4) constructing a source-target domain mixed image $$x_m^i$$

and a corresponding pseudo-label $\widehat{y_m^t}$ based on a random sampling method;

(5) training the cross-domain semantic segmentation model F on all the source domains $$\mathcal{D}_S^i$$

and the target domain $\mathcal{D}_T$ based on the domain-level source-target correlations $d_i$, the pixel-level source-target correlations $$w_i^{(h,w)},$$

the source-target domain mixed image $$x_h^i$$

and the corresponding pseudo-label $\widehat{y_h^t}$, and the source-target domain mixed image $$x_m^i$$

and the corresponding pseudo-label $\widehat{y_m^t}$; and (6) performing, by the trained cross-domain semantic segmentation model F, multi-source domain adaptive semantic segmentation on an image to be detected to extract a target object in the image.

In the present invention, N source domains $$\mathcal{D}_S^i$$

with semantic labels and 1 target domain $\mathcal{D}_T$ without semantic labels are given, wherein i∈N, each source domain $$\mathcal{D}_S^i$$

contains an image $$x_s^i \in \mathbb{R}^{(H\times W\times 3)}$$

and a corresponding semantic label $$y_s^i \in (1, C)^{(H\times W\times 3)},$$

assuming that the semantic labels contain C categories of objects, the target domain $\mathcal{D}_T$ contains an image $x_t$, H is the length of the image, and W is the width of the image.

In step (1), a way of training a cross-domain semantic segmentation model F is as follows:

$$\mathcal{L}_{pre-train}(F) = \mathcal{L}_{seg}^s(F) + \mathcal{L}_{uda}(F)$$

wherein $$\mathcal{L}_{seg}^s(F)$$

is a semantic segmentation training loss on all the source domains $$\mathcal{D}_S^i,$$

$\mathcal{L}_{uda}(F)$ is a multi-source domain adaptive loss between all the source domains $$\mathcal{D}_S^i (i \in N)$$

and the target domain $\mathcal{D}_T$, all the source domains $$\mathcal{D}_S^i$$

comprises images $$x_s^i$$

and corresponding semantic labels $$y_s^i,$$

$i \in N$, and the target domain $\mathcal{D}_T$ comprises an image $x_t$.

In step (2), correlations between the source domains $$\mathcal{D}_s^i$$

and the target domain $\mathcal{D}_T$ are calculated in the domain-level source-target correlations $$d_i = \varphi(\mathcal{D}_S^i, \mathcal{D}_T),$$

wherein $\varphi$ is a domain-level source-target correlation calculation function; and correlations between any pixel $$x_{s_i}^{(h,w)}$$

in the source-target domain $$\mathcal{D}_s^i$$

and the target domain $\mathcal{D}_T$ are calculated in the pixel-level source-target correlations $$w_i^{(h,w)} = \delta(x_{s_i}^{(h,w)}, \mathcal{D}_T),$$

wherein $\delta$ is a pixel-level source-target correlation calculation function.

In step (3), pixels $$\{x_{s_i}^{(h,w)}\} \text{ and } \{y_{s_i}^{(h,w)}\}$$

in source domain images $$x_s^i$$

are selected and cut based on the pixel-level source-target correlations $$w_i^{(h,w)},$$

and then pasted onto a target domain image $x_t$ and a pseudo-label $\hat{y}_t$ to construct the source-target domain mixed image $$x_h^i$$

and the pseudo-label $\widehat{y_h^i}$.

Specifically, selecting and cutting the pixels $$\{x_{s_i}^{(h,w)}\} \text{ and } \{y_{s_i}^{(h,w)}\}$$

that have high correlations with the target domain in the source domain images $$x_s^i$$

based on the pixel-level source-target correlations $$w_i^{(h,w)},$$

which can be determined according to actual needs.

Further, a way of calculating the source-target domain mixed image $$x_h^i$$

and a corresponding pseudo-label $\widehat{y_h^i}$ is as follows:

$$x_h^i = x_s^i * H_{s_i} + x_t^i * (1 - H_{s_i})$$

$$\widehat{y_h^i} = y_s^i * H_{s_i} + \widehat{y_t^i} * (1 - H_{s_i})$$

wherein $H_{s_i}$ is a selection indicator matrix, of which the size is $H \times W$, $H_{s_i}=1$ indicates that the pasted pixels are from the source domain image $$x_s^i,$$

$H_{s_i}=0$ indicates that the pasted pixels are from the target domain image $x_t$:

Specifically, a way of calculating $H_{s_i}$ is as follows:

$$H_{s_i}^{(h,w)} = \begin{cases} 1, & \text{if } w_i^{(h,w)} > \mathcal{T} \\ 0, & \text{otherwise} \end{cases}$$

wherein $\mathcal{T}$ is a correlation threshold and is a hyperparameter. Preferably, $\mathcal{T}=0.85$).

In step (4), a source domain image $$x_s^i$$

and a target domain image $x_t$ are given, pixels $$\{x_{s_i}^{(h,w)}\} \text{ and } \{y_{s_i}^{(h,w)}\}$$

in the source domain image $$x_s^i$$

are selected and cut based on a random sampling method, and then pasted onto the target domain image $x_t$ and a pseudo-label $\hat{y}_t$ to construct the source-target domain mixed image $$x_m^i$$

and the pseudo-label $\widehat{y_m^i}$.

Preferably, randomly selecting and cutting half categories of pixels in the source domain image $$x_s^i.$$

In step (5), a way of training the cross-domain semantic segmentation model F is as follows:

$$\mathcal{L}_{train}(F) = \mathcal{L}_{seg}^h(F) + \mathcal{L}_{seg}^m(F) + d_i \cdot w_i^{(h,w)} \cdot \mathcal{L}_{seg}^s(F) + d_i \cdot w_i^{(h,w)} \cdot \mathcal{L}_{uda}(F)$$

wherein · indicates a weighted operation, $$\mathcal{L}_{seg}^s(F)$$

is a semantic segmentation training loss on all the resource domains $$\mathcal{D}_S^i, \mathcal{L}_{seg}^h(F)$$

is a semantic segmentation training loss on all the source-target domain mixed images $$x_h^i$$

and corresponding pseudo-labels $\widehat{y_h^i}$, $$\mathcal{L}_{seg}^m(F)$$

is a semantic segmentation training loss on all the source-target domain mixed images $$x_m^i$$

and corresponding pseudo-labels $\widehat{y_m^i}$, $\mathcal{L}_{uda}$(F) is a multi-source domain adaptive loss between all the source domains $$\mathcal{D}_S^i$$

and target domain $\mathcal{D}_T$;

$$\mathcal{D}_S^i$$

includes an image $$x_s^i$$

and a corresponding semantic label $$y_s^i,$$

$i \in N$, and the target $\mathcal{D}_T$ contains an image $x_t$.

Also provided in the present invention is a multi-source domain adaptive semantic segmentation device based on multi-level domain correlations, comprising a memory and one or more processors, wherein the memory stores executable codes, and when the one or more processors execute the executable codes, any of the above multi-source domain adaptive semantic segmentation method based on multi-level domain correlations is implemented.

Also provided in the present invention is a computer-readable storage medium on which a program is stored, wherein when the program is executed by a processor, any of the above multi-source domain adaptive semantic segmentation method based on multi-level domain correlations is implemented.

In the present invention, the multi-source domain adaptive semantic segmentation method and device are used to extract the target object in the image, such as ground objects like the mountain and water in the landscape photo, a character in a portrait photo, a dog or cat in a pet photo, a lesion site in a medical image, a building in a remote sensing image, a pedestrian or automatic driving car in an automatic driving car.

The present invention calculates and uses the domain-level source-target correlations and pixel-level source-target correlations when carrying out multi-source domain adaptation and source-target mixed sampling (data enhancement), thereby improving the training performance of the model and making it more suitable for multi-source domain adaptive semantic segmentation.

On the basis of the exist multi-source domain adaptive training, the present invention can improve weights (influence on the training) of the source domains and the pixels in the source domains with high correlations with the target domain, and reduce weights (influence) of the source domains and the pixels in the source domains with low correlations with the target domain, so as to avoid interference of uncorrelated information of multi-source domains on the training.

DESCRIPTION OF THE EMBODIMENTS

In order to better understand the technical solution of this application, implementations of the present invention are described below in combination with examples. It should be made clear that the described embodiments are only part of the embodiments of this application, not all embodiments. Based on the embodiments in this application, all other embodiments obtained by a person skilled in the art without creative labor shall fall within the protection scope of this application.

The terms used in the embodiments of this application are for the sole purpose of describing specific embodiments and are not intended to limit this application. The terms "a", "said" and "the" in a singular form as used in the embodiments and the accompanying claims of this application are also intended to include a plural form, unless the context clearly indicates otherwise.

In the embodiments provided in this application, N source domains $$\mathcal{D}_s^i(i \in N)$$

with semantic labels and 1 target domain $\mathcal{D}_T$ without semantic labels are given, wherein each source domain $$\mathcal{D}_s^i(i \in N)$$

contains an image $$x_s^i \in \mathbb{R}^{(H \times W \times 3)}$$

and a corresponding semantic label $$y_s^i \in (1, C)^{(H \times W \times 3)}$$

(assuming that the semantic labels contain C categories of objects), the target domain $\mathcal{D}_T$ only contains an image $x_t$. The multi-source domain adaptation is to adapt a semantic segmentation model F=E·G trained on a plurality of source domains (E is a feature extractor in the semantic segmentation model, and G is a classifier in the semantic segmentation model) to the target domain.

Figure 1:
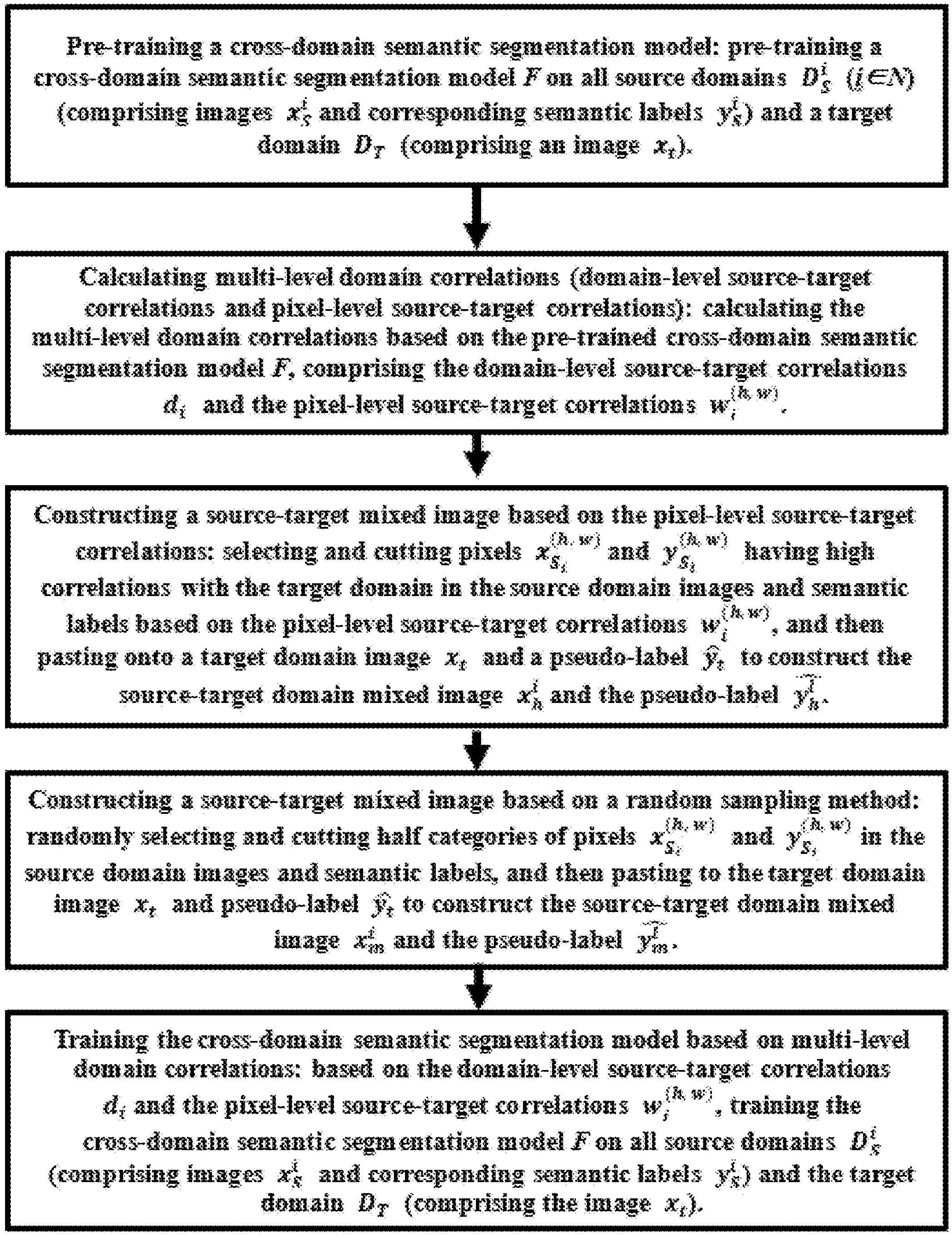
FIG. 1 provides a flow chart of a multi-source domain adaptive semantic segmentation method based on multi-level domain correlations.

As shown in FIG. 1, this embodiment provides a multi-source domain adaptive semantic segmentation method based on multi-level domain correlations, which comprises the following steps:

(1) Pre-training a cross-domain semantic segmentation model: pre-training a cross-domain semantic segmentation model F on all source domains $$\mathcal{D}_s^i(i \in N)$$

(comprising images $$x_s^i$$

and corresponding semantic labels $$y_s^i)$$

and a target domain $\mathcal{D}_T$ (comprising an image $x_t$).

A pre-training formula is as follows:

$$\mathcal{L}_{pre-train}(F) = \mathcal{L}_{seg}^s(F) + \mathcal{L}_{uda}(F)$$

wherein $$\mathcal{L}_{seg}^s(F)$$

is a common (general) semantic segmentation training loss on all the source domains $$\mathcal{D}_s^i(i \in N)$$

(comprising the images $$x_s^i$$

an corresponding semantic labels $$y_s^i).$$

$\mathcal{L}_{uda}$(F) is a common (general) multi-source domain adaptive loss between all the source domains $$\mathcal{D}_s^i(i \in N)$$

(comprising the images $$x_s^i$$

and corresponding semantic labels $$y_s^i)$$

and the target domain $\mathcal{D}_T$ (comprising the image $x_t$).

In the present invention, the semantic segmentation model F can adopt a general semantic segmentation model structure without special restrictions.

In this embodiment, the semantic segmentation training loss $$\mathcal{L}_{seg}^s(F)$$

can adopt a cross-entropy loss function as follows:

$$\mathcal{L}_{seg}^s(F) = -\sum_{i=1}^{N} y_s^i \log F(x_s^i)$$

In this embodiment, the multi-source domain adaptive loss $\mathcal{L}_{uda}$(F) can adopt an entropy minimization loss function:

$$\mathcal{L}_{uda}(F) = -F(x_t)\log F(x_t)$$

(2) Calculating multi-level domain correlations (domain-level source-target correlations, pixel-level source-target correlations): calculating the multi-level domain correlations, the domain-level source-target correlations $d_i$ and the pixel-level source-target correlations $$w_i^{(h,w)}$$

based on the pre-trained cross-domain semantic segmentation model F ($h \in H$, $w \in W$, wherein (h,w) indicates position coordinates of pixels in the image).

wherein correlations between the source domains $$\mathcal{D}_S^i$$

and the target domain $\mathcal{D}_T$ are calculated in the domain-level source-target correlations $$d_i = \varphi(\mathcal{D}_S^i, \mathcal{D}_T)$$

(φ is a domain-level source-target correlation calculation function); and correlations between any pixel $$x_{s_i}^{(h,w)}$$

in the source domains $$\mathcal{D}_S^i$$

and the target domain $\mathcal{D}_T$ are calculated in the pixel-level source-target correlations $$w_i^{(h,w)} = \delta(x_{s_i}^{(h,w)}, \mathcal{D}_T)$$

(δ is a pixel-level source-target correlation calculation function).

In this embodiment, a way of calculating the domain-level source-target correlations $d_i$ may be as follows (exp is an exponential function, $c \in C$ is a class, and is a prototype of class c in the source domains $$\mathcal{D}_S^i$$

(or the target domain $\mathcal{D}_T$)):

$$d_i = \frac{\exp\left(\sum_{c=1}^{C} \|\mathcal{P}_{s_i}^c - \mathcal{P}_t^c\|_1 / C\right)}{\sum_{i=1}^{N} \exp\left(\sum_{c=1}^{C} \|\mathcal{P}_{s_i}^c - \mathcal{P}_t^c\|_1 / C\right)}$$

Specifically, a way of calculating the prototype of class c in the domain (the source domains $$\mathcal{D}_S^i$$

or the target domain $\mathcal{D}_T$) is as follows (* is a matrix dot product, 𝟙 is an indicator function (when $F(x)^{(h,w)}$==c, 𝟙(F(x)$^{(h,w)}$==c)=1; otherwise 0, indicating function reference: Zhou Zhihua. Machine Learning [M]. Beijing: Tsinghua University Press, 2016. Main symbol table):

$$\mathcal{P}^c = \frac{\sum_{h,w}^{H,W} E(x)^{(h,w)} * \mathbb{1}(F(x)^{(h,w)} == c)}{\sum_{h,w}^{H,W} \mathbb{1}(F(x)^{(h,w)} == c)}$$

In this embodiment, a way of calculating the pixel-level source-target correlations $$w_i^{(h,w)}$$

may be as follows (exp is an exponential function, α, β is a hyperparameter (e.g., α=2, β=2), $$D_i^{(h,w)}$$

is a distance from any pixel $$x_{s_i}^{(h,w)}$$

in the source domains $$\mathcal{D}_S^i$$

to a prototype $$\mathcal{P}_t^c$$

closest to the target domain, $$D_i^{mean}$$

is an average value of $$D_i^{(h,w)}$$

corresponding to all pixels $$x_{s_i}^{(h,w)}$$

in the image):

$$w_i^{(h,w)} = \exp\left(\frac{-(D_i^{(h,w)})^\beta}{\alpha(D_i^{mean})^\beta}\right)$$

Specifically, a way of calculating $$D_i^{(h,w)}$$

is as follows (a min function takes the minimum of all distance values):

$$D_i^{(h,w)} = \min\{\|E(x_{s_i})^{(h,w)} - \mathcal{P}_t^c\|_2 | c \in C\}$$

(3) Constructing a source-target domain mixed image $$x_h^i$$

and a corresponding pseudo-label $\widehat{y_h^i}$ based on the pixel-level source-target correlations.

A source domain image $$x_s^i$$

and a target domain image $x_t$ are given, (a set of) pixels $$\{x_{s_i}^{(h,w)}\}$$

in the source domain image $$x_s^i$$

which have high correlations with the target domain are selected and cut based on the pixel-level source-target correlations $$w_i^{(h,w)},$$

and then pasted onto the target domain image $x_t$ to construct a source-target domain mixed image $$x_h^i.$$

Meanwhile, the target domain image $x_t$ is input into the cross-domain semantic segmentation model F to obtain $F(x_t)$, and $F(x_t)$ is used as a pseudo-label $\widehat{y}_t$ of the target domain image.

Similarly, (a set of) pixels $$\{y_{s_i}^{(h,w)}\}$$

in the labels $$y_s^i$$

which have high correlations with the target domain and correspond to the source domain image $$x_s^i$$

are selected and cut, and then pasted to the pseudo-label $\widehat{y}_t$ corresponding to the target domain image $x_t$ to construct a pseudo-label $\widehat{y_h^i}$ of the source-target domain mixed image.

Specifically, a way of calculating the source-target domain mixed image $$x_h^i$$

and the corresponding pseudo-label $\widehat{y_h^i}$ is as follows ($H_{s_i}$ is a selection indicator matrix, of which the size is H×W, $H_{s_i}=1$ indicates that the pasted pixels are from the source domain image $$x_s^i,$$

$H_{s_i}=0$ indicates that the pasted pixels are from the target domain image $x_t$):

$$x_h^i = x_s^i * H_{s_i} + x_t^i * (1 - H_{s_i})$$

$$\widehat{y_h^i} = y_s^i * H_{s_i} + \widehat{y_t^i} * (1 - H_{s_i})$$

Specifically, a way of calculating $H_{s_i}$ is as follows ($\mathcal{T}$ is a correlation threshold, hyperparameter, e.g., $\mathcal{T}$ =0.85):

$$H_{s_i}^{(h,w)} = \begin{cases} 1, & \text{if } w_i^{(h,w)} > \mathcal{T} \\ 0, & \text{otherwise} \end{cases}$$

Figure 2:
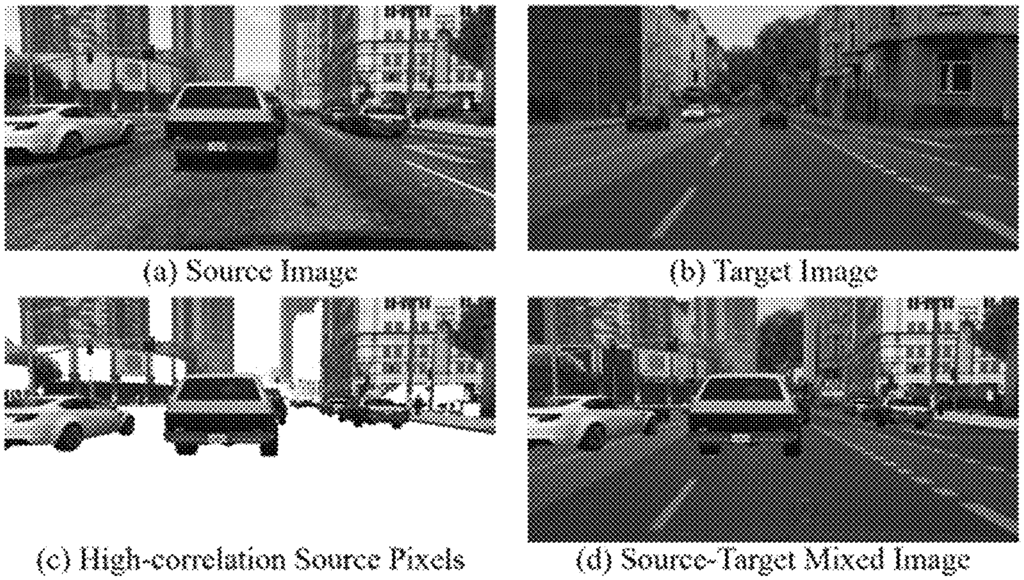
FIG. 2 is an example diagram of constructing a source-target mixed image based on pixel-level source-target correlations in an embodiment.

As shown in FIG. 2, an example of source-target mixed image is constructed based on pixel-level source-target correlations. In FIG. 2, (a) is a source domain image (source image), (b) is a target domain image (target image), and (c) is pixels in the source image that have high correlations with the target domain. (d) is a constructed source-target mixed image (pasting (c) onto (b)).

(4) A pseudo-label $\widehat{y_m^i}$ corresponding to the source-target domain mixed image $$x_m^i$$

is constructed based on a random sampling method.

A source domain image $$x_s^i$$

and a target domain image $x_t$ are given, a half of the categories (the pixels contained) in the source domain image $$x_s^i$$

are randomly selected, cut and pasted onto the target domain image $x_t$ to construct the source-target domain mixed image $$x_m^i.$$

Meanwhile, a pseudo-label $\widehat{y_m^i}$ corresponding to the mixed image $$x_m^i$$

is constructed.

A method of constructing the source-target domain mixed image $$x_m^i$$

and the corresponding pseudo-label $\widehat{y_m^i}$ is similar to (3), the only difference is that the $H_{s_i}$ is replaced by $M_{s_i}$. $M_{s_i}$ randomly selects half of the categories (pixels contained) of the source domain image $$x_s^i.$$

(5) Training the cross-domain semantic segmentation model based on multi-level domain correlations: training the cross-domain semantic segmentation model F on all source domains $$\mathcal{D}_s^i (i \in N)$$

(comprising images $$x_s^i$$

and corresponding semantic labels $$y_s^i)$$

and a target domain $\mathcal{D}_T$ (comprising an image $x_t$) based on the domain-level source-target correlations $d_i$, the pixel-level source-target correlations $$w_i^{(h,w)}.$$

A training formula is as follows:

$$\mathcal{L}_{train}(F) = \mathcal{L}_{seg}^h(F) + \mathcal{L}_{seg}^m(F) + d_i \cdot w_i^{(h,w)} \cdot \mathcal{L}_{seg}^s(F) + d_i \cdot w_i^{(h,w)} \cdot \mathcal{L}_{uda}(F)$$

wherein · indicates a weighting operation.

$$\mathcal{L}_{seg}^s(F)$$

is the common (general) semantic segmentation training loss on all the source domains $$\mathcal{D}_s^i(i \in N)$$

(comprising the images $$x_s^i$$

and corresponding semantic labels $$y_s^i); \mathcal{L}_{seg}^h(F)$$

is the common (general) semantic segmentation training loss on all the source-target domain mixed images $$x_h^i$$

and the corresponding pseudo-labels $\widehat{y_h^i}$;

$$\mathcal{L}_{seg}^m(F)$$

is the common (general) semantic segmentation training loss on all the source-target domain mixed images $$x_m^i$$

and the corresponding pseudo-labels $\widehat{y_m^i}$; $\mathcal{L}_{uda}$(F) is the common (generic) multi-source domain adaptive loss between all the source domains $$\mathcal{D}_s^i(i \in N)$$

(comprising the images $$x_s^i$$

and corresponding semantic labels $$y_s^i)$$

and target domain $\mathcal{D}_T$ (comprising the image $x_t$).

In this embodiment, the semantic segmentation training loss $$\mathcal{L}_{seg}^h(F)$$

can adopt a cross-entropy loss function as follows:

$$\mathcal{L}_{seg}^h(F) = -\sum_{i=1}^{N} \widehat{y_h^i} \log F(x_h^i)$$

In this embodiment, the semantic segmentation training loss $$\mathcal{L}_{seg}^m(F)$$

can adopt a cross-entropy loss function as follows:

$$\mathcal{L}_{seg}^m(F) = -\sum_{i=1}^{N} \widehat{y_m^i} \log F(x_m^i)$$

In this embodiment, the semantic segmentation training loss $$\mathcal{L}_{seg}^w(F) = d_i \cdot w_i^{(h,w)} \cdot \mathcal{L}_{seg}^s(F)$$

based on multi-level domain correlations can adopt a cross-entropy loss function as follows:

$$\mathcal{L}_{seg}^w(F) = -\sum_{i=1}^{N} d_i \sum_{h,w}^{H,W} w_i^{(h,w)} (y_s^i)^{(h,w)} \log (F(x_s^i))^{(h,w)}$$

In this embodiment, the multi-source domain adaptive loss $\mathcal{L}_{uda}$(F) based on multi-level domain correlations can adopt an entropy minimization loss function as follows:

$$\mathcal{L}_{uda}(F) = -\sum_{i=1}^{N} d_i \sum_{h,w}^{H,W} w_i^{(h,w)} F(x_t)^{(h,w)} \log F(x_t)^{(h,w)}$$

Table 1 to Table 3 show comparison results of intersection over union between the method of the present invention and the state-of-the-art SSDA method and the state-of-the-art MSDA method (Synthesis from automatic driving of multiple sources (SYNTHIA) [German Ros, Laura Sellart, Joanna Materzynska, David Vazquez, and Antonio M Lopez. 2016. The synthia dataset: A large collection of synthetic images for semantic segmentation of urban scenes [C]. In Proceedings of the IEEE conference on computer vision and pattern recognition. 3234-3243.] Datasets and Automatic Driving Game Simulation (GTA5) [Stephan R Richter, Vibhav Vineet, Stefan Roth, and Vladlen Koltun. 2016. Playing for data: Ground truth from computer games [C]. In Proceedings of the European conference on computer vision. 102-118.] Migration of datasets to automatic driving real cityscape [Marius Cordts, Mohamed Omran, Sebastian Ramos, Timo Rehfeld, Markus Enzweiler, Rodrigo Benenson, Uwe Franke, Stefan Roth, and Bernt Schiele. 2016. The cityscapes dataset for semantic urban scene understanding [C]. In Proceedings of the IEEE conference on computer vision and pattern recognition. 3213-3223.] datasets).

S, G, and A represent training the model by using different datasets (SYNTHIA, GTA5, and All), respectively. mIoU indicates a mean intersection over union.

As can be seen from Table 1 to Table 3, different source domains have different influences on domain adaptation. Models such as a benchmark source-only (without a domain adaptation technique) method, ProDA, and CPSL trained on GTA5 have better adaptation performance than the same type of model trained on SYNTHIA. The main reason is that correlation between a GTA5 dataset and a Cityscapes dataset is higher than the correlation between a SYNTHIA dataset and a Cityscapes dataset. In addition, the use of multi-source domain datasets significantly improves the generalization performance of the benchmark source-only (without the domain adaptation technique) model on the Cityscapes dataset. For example, the source-only model in the Cityscapes dataset increases from 32.3% (SYNTHIA→Cityscapes) and 36.4% (GTA5→Cityscapes) to 41.1% (SYNTHIA+GTA5→Cityscapes). However, training the SSDA methods directly on the two datasets, SYNTHIA and GTA5, does not achieve much improvement, for example, the improvement of BiSMAP is only 0.4%. This is because the SSDA method does not take into account complex domain shifts between multiple sources and target domain, especially the negative influences of low correlation source domains and pixels. An interesting phenomenon is that some SSDA methods outperform many MSDA methods due to the rapid development of adaptation techniques in the SSDA methods. By taking full advantage of the highly correlated source domains and reducing the negative influences of noisy pixels, the method provided by the present invention achieves 63.8% mIoU over 16 classes, which is above 3.3% better than all the SSDA and MSDA methods.

TABLE 1

Performance comparison of the present invention with different types of multi-source domain adaptive semantic segmentation

| Methods | Training datasets | Highway | Sidewalk | Building | Wall | Fence |
|---|---|---|---|---|---|---|
| source-only | G | 72.2 | 26.7 | 72.7 | 13.6 | 6.2 |
| ProDA | G | 87.1 | 44 | 83.2 | 26.9 | 0.7 |
| BAPA | G | 91.7 | 53.8 | 83.9 | 22.4 | 0.8 |
| CPSL | G | 87.3 | 44.4 | 83.8 | 25 | 0.4 |
| EHTDI | G | 93 | 69.8 | 84 | 36.6 | 9.1 |
| source-only | S | 45.6 | 19.5 | 59.6 | 9.4 | 3.6 |
| DACS | S | 89.9 | 39.7 | 87.9 | 30.7 | 39.5 |
| SAC | S | 90.4 | 53.9 | 86.6 | 42.4 | 27.3 |
| ProDA | S | 91.5 | 52.4 | 82.9 | 42 | 35.7 |
| Coarse | S | 92.5 | 58.3 | 86.5 | 27.4 | 28.8 |
| DSP | S | 92.4 | 48 | 87.4 | 33.4 | 35.1 |
| CPSL | S | 91.7 | 52.9 | 83.6 | 43 | 32.3 |
| BiSMAP | S | 86.2 | 48.4 | 83.5 | 43.8 | 38.2 |
| source-only | A | 76.3 | 36.9 | 71.5 | 14.1 | 10.3 |
| MADAN | A | 88.1 | 46.1 | 79.9 | 26.4 | 7.4 |
| MADAN+ | A | 90.9 | 49.7 | 64.9 | 24.6 | 13 |
| MDACL | A | — | — | — | — | — |
| MDAPLR | A | 94.8 | 66.3 | 86.2 | 36.1 | 22.6 |
| BiSMAP | A | 94.9 | 64.5 | 84.4 | 38 | 37.8 |
| The present invention | A | 95.3 | 66.8 | 89.9 | 44.5 | 37.4 |

TABLE 2

Performance comparison of the present invention with different types of multi-source domain adaptive semantic segmentation

| Methods | Training datasets | Electric pole | Traffic light | Traffic sign | Vegetation | Sky | Pedestrian |
|---|---|---|---|---|---|---|---|
| source-only | G | 26.1 | 3.5 | 2.7 | 78.4 | 76.8 | 48.8 |
| ProDA | G | 42 | 45.8 | 34.2 | 86.7 | 81.3 | 68.4 |
| BAPA | G | 34.9 | 30.5 | 42.8 | 86.6 | 88.2 | 66 |
| CPSL | G | 42.9 | 47.5 | 32.4 | 86.5 | 83.3 | 69.6 |
| EHTDI | G | 39.7 | 42.2 | 43.8 | 88.2 | 88.1 | 68.3 |
| source-only | S | 31.4 | 7.4 | 6.2 | 74.2 | 73.6 | 50.5 |
| DACS | S | 38.5 | 46.4 | 52.8 | 88 | 88.8 | 67.2 |
| SAC | S | 45.1 | 48.5 | 42.7 | 87.4 | 86.1 | 67.5 |
| ProDA | S | 40 | 44.4 | 43.3 | 87 | 79.5 | 66.5 |
| Coarse | S | 38.1 | 46.7 | 42.5 | 85.4 | 91.8 | 66.4 |
| DSP | S | 36.4 | 41.6 | 46 | 87.7 | 89.8 | 66.6 |
| CPSL | S | 43.7 | 51.3 | 42.8 | 85.4 | 81.1 | 69.5 |
| BiSMAP | S | 41.8 | 49.5 | 54.7 | 87.9 | 84.7 | 63.9 |
| source-only | A | 28.8 | 15 | 12.4 | 81.2 | 81.7 | 55.8 |
| MADAN | A | 30.6 | 19 | 19.9 | 80.4 | 75.9 | 55.6 |
| MADAN+ | A | 39.2 | 40 | 21.4 | 80.2 | 86.1 | 57.3 |
| MDACL | A | — | — | — | — | — | — |
| MDAPLR | A | 43.7 | 46.9 | 40.9 | 88.6 | 88.9 | 63.1 |
| BiSMAP | A | 39.2 | 45.6 | 43.8 | 84.7 | 82.8 | 61.7 |
| The present invention | A | 42 | 49.4 | 50.9 | 86.1 | 86.4 | 66.2 |

TABLE 3

Performance comparison of the present invention with different types of multi-source domain adaptive semantic segmentation

| Methods | Training datasets | Biker | Automobile | Bus | Motorbike | Bicycle | mIoU |
|---|---|---|---|---|---|---|---|
| source-only | G | 13.6 | 72.6 | 26.6 | 16.3 | 25.1 | 36.4 |
| ProDA | G | 22.1 | 87.7 | 50 | 31.4 | 38.6 | 51.9 |
| BAPA | G | 34.1 | 86.6 | 51.3 | 29.4 | 50.5 | 53.3 |
| CPSL | G | 29.1 | 89.4 | 52.1 | 42.6 | 54.1 | 54.4 |
| EHTDI | G | 29 | 85.5 | 54.1 | 37.1 | 56.3 | 57.8 |
| source-only | S | 10.6 | 69.1 | 29.2 | 10.1 | 16.4 | 32.3 |
| DACS | S | 35.8 | 84.5 | 50.2 | 27.3 | 34 | 56.3 |
| SAC | S | 29.7 | 88.5 | 54.6 | 26.6 | 45.3 | 57.7 |
| ProDA | S | 31.4 | 86.7 | 52.5 | 45.4 | 53.8 | 58.4 |
| Coarse | S | 37 | 87.8 | 52.4 | 41.7 | 59 | 58.9 |
| DSP | S | 32.1 | 89.9 | 56.1 | 44.1 | 57.8 | 59 |
| CPSL | S | 30 | 88.1 | 59.9 | 47.2 | 48.4 | 59.4 |
| BiSMAP | S | 34.4 | 89.1 | 62.2 | 37.1 | 56.6 | 60.1 |
| source-only | A | 14.6 | 81.3 | 34.1 | 21.3 | 21.5 | 41.1 |
| MADAN | A | 15.6 | 84.1 | 47 | 23.3 | 26.3 | 45.4 |
| MADAN+ | A | 25 | 84.7 | 35.7 | 25.2 | 38.2 | 48.5 |
| MDACL | A | — | — | — | — | — | 54 |
| MDAPLR | A | 23.5 | 89.7 | 53.8 | 20.9 | 42.7 | 56.8 |
| BiSMAP | A | 43.4 | 86.9 | 58.3 | 43.2 | 58 | 60.5 |
| The present invention | A | 44.8 | 89.9 | 63.8 | 46.8 | 60.4 | 63.8 |

When the domain adaptation is carried out, the pixels which are similar and highly correlated to the target domain in the source domain image are selected for the adaptive training, which is benefit to the segmentation model to learn the potential features of the target domain better. However, the source domain and pixels of the source domain which are different from and are lowly correlated to the target domain are not benefit to the domain adaptation. Therefore, when adapting the model from multi-source domains to the target domain, it is necessary to reduce the influence of low-correlation source domains and source domain pixels, and enhance the adaptive learning of the target model. However, existing multi-source domain adaptive algorithms usually only use step (1), ignoring domain-level source-target correlations (DSCs) among domains and pixel-level source-target correlations (PSCs), resulting that uncorrelated domains and pixels in the source domains would degrade model performance. Existing source-target mixed sampling (data enhancement) techniques, such as step (4), ignore the pixel-level source-target correlations.

In contrast, the method provided in the present invention calculates and uses the domain-level source-target correlations and pixel-level source-target correlations when carrying out multi-source domain adaptation and source-target mixed sampling (data enhancement), thereby improving the training performance of the model.

Also provided in an embodiment of the present invention is a multi-source domain adaptive semantic segmentation device based on multi-level domain correlations, comprising one or more processors, wherein the memory stores executable codes, and when the processors execute the executable codes, the multi-source domain adaptive semantic segmentation method based on multi-level domain correlations in the above embodiments is implemented. Taking software implementation as an example, as a device in a logical sense, it is formed by reading the corresponding computer program instructions in a non-volatile memory into a memory through a processor of any device with data processing capability. From a hardware aspect, in addition to the processor, memory, network interface, and non-volatile memory, any apparatus with the data processing capability where the device is located in the embodiments may also comprise other hardware according to actual functions of any apparatus with the data processing capability, which is not repeated herein.

Also provided in the present invention is a computer-readable storage medium on which a program is stored, wherein when the program is executed by a processor, the above multi-source domain adaptive semantic segmentation method based on multi-level domain correlations is implemented. The computer readable storage medium may be an internal storage unit of any apparatus with data processing capability described in any of the preceding embodiments, such as a hard disk or memory. The computer readable storage medium can also be any apparatus with data processing capability, such as a plug-in hard disk, smart media card (SMC), SD card, flash memory card (Flash8 Card), equipped on the apparatus. Further, the computer readable storage medium may also comprise both an internal storage unit of any apparatus with the data processing capability and an external storage apparatus. The computer readable storage medium is used to store the computer program and other programs and data required by any apparatus with the data processing capability, and can also be used to temporarily store data that has been output or is to be output.

The above are only embodiments of the present invention and are not intended to limit the present invention. The present invention may be subject to various alterations and variations to a person skilled in the art. Any modification, equivalent replacement, improvement, etc. made within the spirit and principle of the present invention shall be included within the scope of the claims of the present invention.

What is claimed is:

1. A multi-source domain adaptive semantic segmentation method based on multi-level domain correlations, wherein the method comprises:

(1) pre-training a cross-domain semantic segmentation model F on all source domains $$\mathcal{D}_S^i$$

and a target domain $\mathcal{D}_T$;

(2) calculating the multi-level domain correlations based on the pre-trained cross-domain semantic segmentation model F, comprising domain-level source-target correlations $d_i$ and pixel-level source-target correlations $$w_i^{(h,w)},$$

$h \in H$, $w \in W$, wherein (h,w) indicates position coordinates of pixels in an image;

(3) constructing a source-target domain mixed image $$x_h^i$$

and a corresponding pseudo-label $\widehat{y_h^i}$ based on the pixel-level source-target correlations;

(4) constructing a source-target domain mixed image $$x_m^i$$

and a corresponding pseudo-label $\widehat{y_m^i}$ based on a random sampling method;

(5) training the cross-domain semantic segmentation model F on all the source domains $$\mathcal{D}_S^i$$

and the target domain $\mathcal{D}_T$ based on the domain-level source-target correlations $d_i$, the pixel-level source-target correlations $$w_i^{(h,w)},$$

the source-target domain mixed image $$x_h^i$$

and the corresponding pseudo-label $\widehat{y_h^i}$, and the source-target domain mixed image $$x_m^i$$

and the corresponding pseudo-label $\widehat{y_m^i}$; and (6) performing, by the trained cross-domain semantic segmentation model F, multi-source domain adaptive semantic segmentation on an image to be detected to extract a target object in the image.

2. The multi-source domain adaptive semantic segmentation method based on multi-level domain correlations according to claim 1, wherein N source domains $$\mathcal{D}_S^i$$

with semantic labels and 1 target domain $\mathcal{D}_T$ without semantic labels are given, wherein i∈N, each source domain $$\mathcal{D}_S^i$$

contains an image $$x_s^i \in \mathbb{R}^{(H \times W \times 3)}$$

and a corresponding semantic label $$y_s^i \in (1, C)^{(H \times W \times 3)},$$

assuming that the semantic labels contain C categories of objects, the target domain $\mathcal{D}_T$ contains an image $x_t$, H is the length of the image, and W is the width of the image.

3. The multi-source domain adaptive semantic segmentation method based on multi-level domain correlations according to claim 1, wherein in step (1), a way of pre-training a cross-domain semantic segmentation model F is as follows:

$$\mathcal{L}_{pre-train}(F) = \mathcal{L}_{seg}^s(F) + \mathcal{L}_{uda}(F)$$

wherein $$\mathcal{L}_{seg}^s(F)$$

is a semantic segmentation training loss on all the source domains $$\mathcal{D}_S^i,$$

$\mathcal{L}_{uda}$(F) is a multi-source domain adaptive loss between all the source domains $$\mathcal{D}_S^i$$

and the target domain $\mathcal{D}_T$, all the source domains comprises images $$\mathcal{D}_S^i$$

comprises images $$x_s^i$$

and corresponding semantic labels $$y_s^i,$$

i∈N, and the target domain $\mathcal{D}_T$ comprises an image $x_t$.

4. The multi-source domain adaptive semantic segmentation method based on multi-level domain correlations according to claim 1, wherein in step (2), correlations between the source domains $$\mathcal{D}_S^i$$

and the target domain $\mathcal{D}_T$ are calculated in the domain-level source-target correlations $$d_i = \varphi(\mathcal{D}_S^i, \mathcal{D}_T),$$

wherein φ is a domain-level source-target correlation calculation function; and correlations between any pixel $$x_{s_i}^{(h,w)}$$

in the source domains $$\mathcal{D}_S^i$$

and the target domain $\mathcal{D}_T$ are calculated in the pixel-level source-target correlations $$w_i^{(h,w)} = \delta(x_{s_i}^{(h,w)}, \mathcal{D}_T),$$

wherein δ is a pixel-level source-target correlation calculation function.

5. The multi-source domain adaptive semantic segmentation method based on multi-level domain correlations according to claim 1, wherein in step (3), pixels $$\{x_{s_i}^{(h,w)}\} \text{ and } \{y_{s_i}^{(h,w)}\}$$

in source domain images $$x_s^i$$

are selected and cut based on the pixel-level source-target correlation $$w_i^{(h,w)},$$

and then pasted onto a target domain image $x_t$ and a pseudo-label $\hat{y}_t$ to construct the source-target domain mixed image $$x_h^i$$

and the pseudo-label $\widehat{y_h^i}$.

6. The multi-source domain adaptive semantic segmentation method based on multi-level domain correlations according to claim 5, wherein a way of calculating the source-target domain mixed images $$x_h^i$$

and the corresponding pseudo-labels $\widehat{y_h^i}$ is as follows:

$$x_h^i = x_s^i * H_{s_i} + x_t^i * (1 - H_{s_i})$$

$$\widehat{y_h^i} = y_s^i * H_{s_i} + \widehat{y_t^i} * (1 - H_{s_i})$$

wherein $H_{s_i}$ is a selection indicator matrix, of which the size is H×W, $H_{s_i}=1$ indicates that the pasted pixels are from the source domain image $$x_s^i,$$

$H_{s_i}=0$ indicates that the pasted pixels are from the target domain image $x_t$:

specifically, a way of calculating $H_{s_i}$ is as follows:

$$H_{s_i}^{(h,w)} = \begin{cases} 1, & \text{if } w_i^{(h,w)} > \mathcal{T} \\ 0, & \text{otherwise} \end{cases}$$

wherein $\mathcal{T}$ is a correlation threshold and is a hyperparameter.

7. The multi-source domain adaptive semantic segmentation method based on multi-level domain correlations according to claim 1, wherein in step (4), a source domain image $$x_s^i$$

and a target domain image $x_t$ are given, pixels $$\{x_{s_i}^{(h,w)}\} \text{ and } \{y_{s_i}^{(h,w)}\}$$

in the source domain image $$x_s^i$$

are selected and cut based on a random sampling method, and then pasted onto the target domain image $x_t$ and a pseudo-label $\hat{y}_t$ to construct the source-target domain mixed image $$x_m^i$$

and the pseudo-label $\widehat{y_m^i}$.

8. The multi-source domain adaptive semantic segmentation method based on multi-level domain correlations according to claim 1, wherein in step (5), a way of training the cross-domain semantic segmentation model F is as follows:

$$\mathcal{L}_{train}(F) = \mathcal{L}_{seg}^h(F) + \mathcal{L}_{seg}^m(F) + d_i \cdot w_i^{(h,w)} \cdot \mathcal{L}_{seg}^s(F) + d_i \cdot w_i^{(h,w)} \cdot \mathcal{L}_{uda}(F)$$

wherein · indicates a weighted operation, $$\mathcal{L}_{seg}^s(F)$$

is a semantic segmentation training loss on all the resource domains $$\mathcal{D}_S^i, \mathcal{L}_{seg}^h(F)$$

is a semantic segmentation training loss on all the source-target domain mixed images $$x_h^i$$

and corresponding pseudo-labels $\widehat{y_h^i}$, $$\mathcal{L}_{seg}^m(F)$$

is a semantic segmentation training loss on all the source-target domain mixed images $$x_m^i$$

and corresponding pseudo-labels $\widehat{y_m^i}$, $\mathcal{L}_{uda}(F)$ is a multi-source domain adaptive loss between all the source domains $$\mathcal{D}_S^i$$

and target domain $\mathcal{D}_T$;

$$\mathcal{D}_s^i$$

includes an image $$x_s^i$$

and a corresponding semantic label $$y_s^i,$$

$i \in N$, and the target $\mathcal{D}_T$ contains an image $x_t$.

9. A multi-source domain adaptive semantic segmentation device based on multi-level domain correlations, comprising a memory and one or more processors, wherein the memory stores executable codes, and when the one or more processors execute the executable codes, the multi-source domain adaptive semantic segmentation method based on multi-level domain correlations according to claim 1 is implemented.

10. A non-transitory computer-readable storage medium on which a program is stored, wherein when the program is executed by a processor, the multi-source domain adaptive semantic segmentation method based on multi-level domain correlations according to claim 1 is implemented.

* * * * *